United States Patent [19]

Beemer et al.

[11] 4,049,084
[45] Sept. 20, 1977

[54] AUDIBLE LINING WEAR INDICATOR

[75] Inventors: Richard B. Beemer, Lombard; Richard G. Hennessey, Oak Lawn, both of Ill.

[73] Assignee: International Harvester Company, Chicago, Ill.

[21] Appl. No.: 635,817

[22] Filed: Nov. 28, 1975

[51] Int. Cl.² .............................................. F16D 66/02
[52] U.S. Cl. ................... 188/1 A; 116/114 Q; 192/30 W
[58] Field of Search ............... 188/1 A, 73.2, 264 E; 192/30 W, 70.14, 107 M; 116/67 R, 114 Q

[56] References Cited

U.S. PATENT DOCUMENTS

| 2,093,324 | 9/1937 | Lansing | 192/107 M X |
|---|---|---|---|
| 3,198,295 | 8/1965 | Fangman et al. | 188/264 E |
| 3,406,800 | 10/1968 | Buchanan | 192/30 W |
| 3,548,979 | 12/1970 | Nelson et al. | 188/218 XL X |
| 3,897,860 | 8/1975 | Borck et al. | 188/264 E |

FOREIGN PATENT DOCUMENTS 159,976  11/1954  Australia ............... 188/1 A

*Primary Examiner*—George E. A. Halvosa
*Attorney, Agent, or Firm*—Douglas W. Rudy; Floyd B. Harman

[57] ABSTRACT

Providing a secondary frictional material between a primary frictional material and a backing plate for use in a clutch or brake system having a reaction member which operates in an oil bath, whereupon the consumption of the primary frictional material through contact with the reaction member allows contact between the secondary frictional material and the reaction member. The secondary frictional material is of a composition such that upon motion contact with a reaction member an audible sound is produced.

2 Claims, 11 Drawing Figures

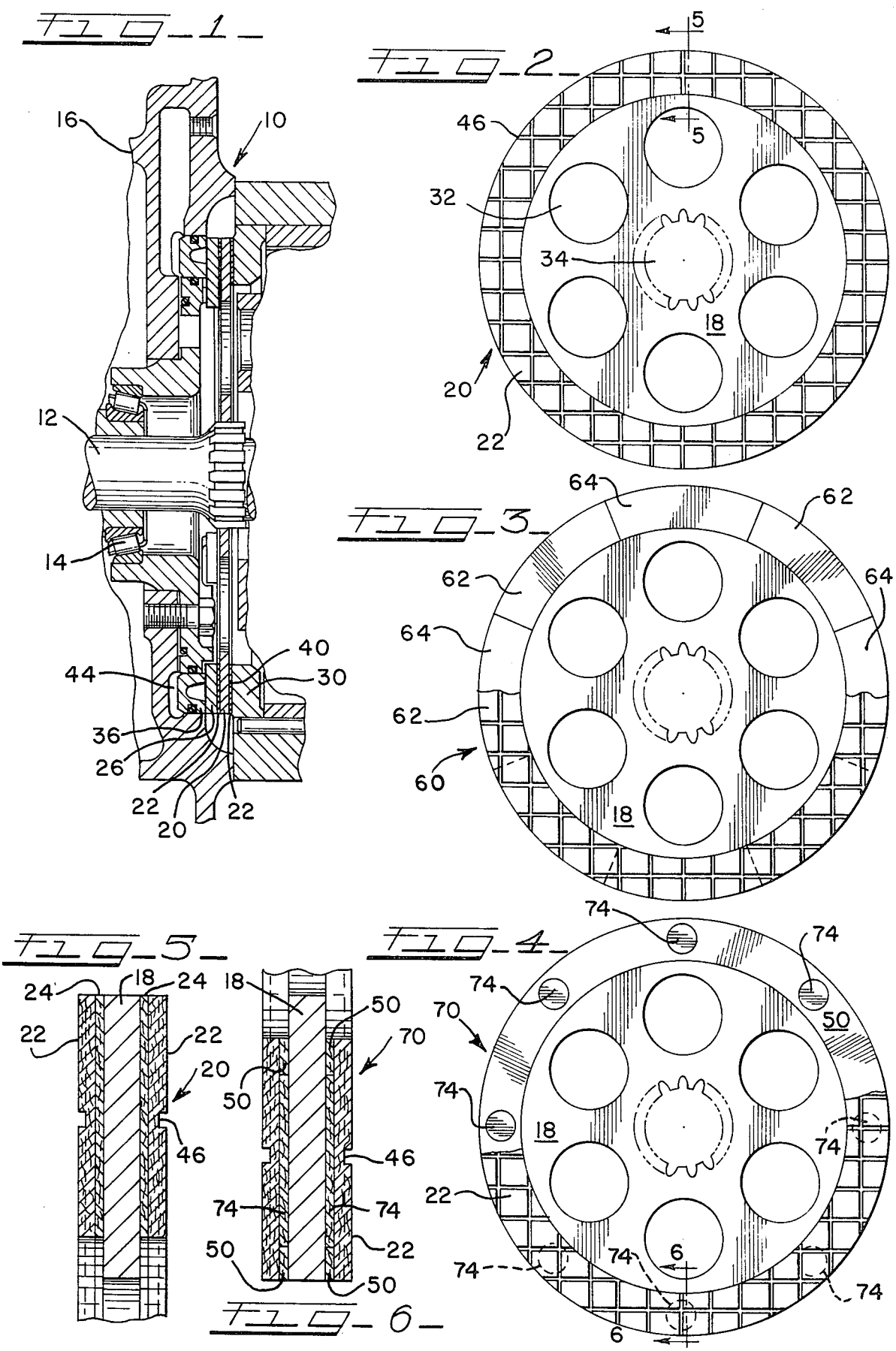

AUDIBLE LINING WEAR INDICATOR

BACKGROUND OF THE INVENTION

1. Field of the Invention

The present invention relates to disc brakes and clutches for vehicles generally, and more particularly to wheel brakes having wear indicating devices. The disc brake of this invention may operate in an oil bath for cooling purposes.

2. Description of the Prior Art

Wheel brakes carried on axles residing in a fluid bath are in contemporary use on vehicles such as farm machinery, as well as others. Typically, agricultural and industrial tractors are equipped with inboard brakes for the rear axle. These inboard brakes may be disc brakes which operate in an oil bath which also serves as a source of fluid for hydraulic components of the tractor as well as a lubricant for the differential. These brake systems utilize an annular piston to apply pressure to a disc which is splined to a planetary drive shaft. The opposite side of the disc adjoins a stationary outer disc ring and is in contact with it during braking. The brake operates in a fluid environment that ensures adequate cooling of the brake disc. The frictional surface on either side of the disc may have a lining of microscopically porous paper-like material bonded to either side thereof.

Through normal braking the lining is gradually worn away. When the lining is completely worn away the disc will, upon braking, be clamped between the surfaces of a brake center disc being biased by the annular piston and the pressure plate or outer disc ring. As metal-to-metal contact is now possible (as the lining material has been worn away), galling of the contacting surfaces will occur.

In brake systems without wear indicating devices the vehicle operator may not be aware that the lining has worn away. Generally when the brake lining on brakes of this type do eventually fail there will still be adequate stopping force available to control the vehicle. As a matter of fact, the vehicle operator may not be aware of brake failure until deterioration of the metal components has taken place. One of the first signs of defective brake components shows up in the hydraulic system of the vehicle as the brakes generally operate in a bath of hydraulic fluid which is also used in the vehicle hydraulic system. Hydraulic system component failures are quite possible as metal particles from the brake disc or plates may produce significant damage to filters, pumps, and piston seals.

There are brake pad wear warning systems available for use with conventional dry type disc brakes. A typical embodiment shows a metallic reed bonded to the pad backing plate perpendicular to the surface of the brake rotor. The reed contacts the rotor after the pad has partially worn away and produces an audible signal. This type of warning device could not be used for a hydraulic fluid cooled brake as it would produce metallic particles which may damage the hydraulic systems of the host vehicle.

The device disclosed herein is, to our knowledge, the only audible wear indicating device that can be effectively used with disc brakes which operate in a hydraulic fluid bath.

It is therefore, an object of this invention to present a disc brake system that has a built in warning indicator that indicates worn brakes before such wear becomes detrimental to the brake components or the various hydraulic components of the vehicle.

Another object of this invention is to present a warning device for use with liquid cooled brakes that will not detrimentally contaminate the cooling fluid.

Also an object of the invention is to present a warning system having an audible warning signal which can be heard by the vehicle operator over the noise of the vehicle.

Furthermore, it is an object of this invention to provide an audible warning device that can provide a high level of braking effectiveness.

It is also an object of the present invention to provide a warning device for use on a disc brake which is easily manufactured and relatively inexpensive.

Inasmuch as this invention could find application in other areas, such as wet or dry clutches, it is an object of this invention to provide an assembly using two frictional medias of different properties such that upon contact with a moving reactive member and a primary frictional material a first set of desirable characteristics is evident and upon contact with a secondary frictional material a second set of desirable characteristics is evident.

These and other objects and many of the attendant advantages of the present invention will become more readily apparent upon a perusal of the following description and the accompanying drawings.

BRIEF DESCRIPTION OF THE DRAWINGS

FIG. 1 is a cross-sectional view in elevation, with portions broken away or omitted, of a disc brake system incorporating a preferred embodiment of the present invention;

FIG. 2 is a side elevation view of the friction plate disc shown in FIG. 1;

FIG. 3 is an elevation view of a partially complete friction plate disc showing an alternative embodiment;

FIG. 4 is another alternative embodiment showing an elevation view of a partially complete friction plate disc;

FIG. 5 is an enlarged cross-sectional view of the frictional lining material as taken through the plane shown as 5—5 of FIG. 2;

FIG. 6 is an enlarged cross-sectional view of the frictional lining material through plane 6—6 of the alternative friction plate disc shown in FIG. 4;

In the following description like numerals are associated with like components wherever possible.

DESCRIPTION OF THE PREFERRED EMBODIMENT

Figure 7:
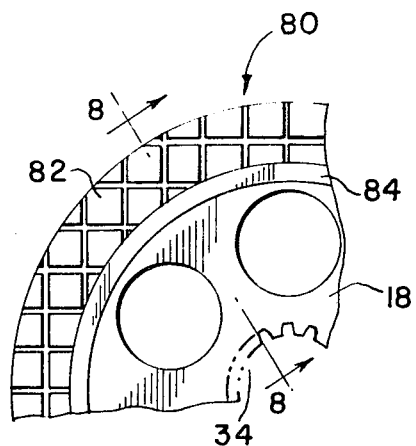
FIG. 7 is a broken away quandrant from a friction plate showing an alternative arrangement of frictional materials.

Referring now to FIGS. 1 and 2 a disc brake mechanism, indicated generally at 10, is utilized to constrain or stop a planetary drive shaft 12 rotatably mounted by a bearing 14 within a housing 16. The housing 16 may consist of several parts which are secured together and function as a unitary structure.

The brake mechanism 10 includes a brake disc 20 having a lining bonded to the opposite faces thereof. The disc 20 is splined or otherwise secured to, while being axially slidable on, the shaft 12 and consequently rotates therewith.

The brake disc 20 is a circular flat plate having a splined centrally located aperture which allows mounting of the brake disc to the splines of the drive shaft 12. The brake disc has an inner surface and an outer surface, each surface having two-part lining material 22 and 24 respectively, bonded thereto (FIG. 5). The two part lining material is composed of a primary frictional material 22 having a microscopically porous paper-like construction and a secondary frictional material 24 which may be a noise producing frictional material. The brake disc 20 has a diameter approximately the diameter of the brake center disc 26 which also approximates the outer diameter of the reaction ring or outer disc ring 30.

A plurality of axially disposed apertures 32 are provided in the brake disc 20 in the area between the splined central aperture 34 of the brake disc and the outer diameter area of the brake disc which hosts the lining material. These apertures allow fluid flow past the brake disc while at the same time reducing the weight of the brake disc.

The inboard reaction ring or brake center disc 26 is retained within, and is movable with respect to the housing 16 axially of the shaft 12. The brake center disc 26 has a flat surface formed on one side for engagement with the lining 22 on the inner surface of the brake disc while the opposite face is also of a flat surface for even contact with the annular piston 36. The brake center disc 26 is equipped with three internal lugs (not shown) which align with three channels in the housing 16. The internal lugs in the channels permit axial movement of the brake center disc 26 parallel to the planetary drive shaft 12 upon displacement by the annular piston 36 while prohibiting rotational movement of the brake center disc 26 around the shaft 12.

The annular piston 36 is suitably sealed for movement within an annular chamber 44 formed in the housing 16. Conventional means are provided for admitting fluid under pressure to a chamber 44 to apply or engage the brake mechanism 10 and for venting or draining the fluid.

The lining material used on the brake disc 20 is the focus of the invention. Looking at FIGS. 2 and 5 it can be seen that the brake disc or friction disc is made up of several laminations.

A core plate 18 is a flat annular disc having obverse and reverse surfaces, further having a plurality of apertures including a splined central aperture 34 compatible with the splines of the planetary drive shaft 12 and a plurality of ventilation apertures 32 to allow the passage of fluid past the brake disc is provided. To the core plate 18 several laminations of material are bonded.

First the secondary frictional material is bonded to both sides of the plate using an appropriate bonding agent. In this preferred embodiment the material will be a flat continuous annular ring around the periphery of the core plate. The secondary frictional material is relatively thin, for instance, on the order of, but not limited to, 0.002 to 0.010 inches in thickness. This material is engineered to produce a resonance resulting in audible sound when it is under pressure in motion such as may be envisioned in a braking situation. Generally, the secondary frictional material is a microporous paper-like material.

Noise producing brake frictional material is not normally desirable for use in braking systems as brake system engineers have always tried to engineer frictional materials for noise-free quiet operation. Noise is generated under normal braking forces in frictional material if the static and dynamic coefficients of friction of the material are far apart. As the static and dynamic coefficients come closer together the frictional material becomes less noisey as there is less resonance generated. The secondary frictional material used in this preferred embodiment is relatively noisy due to the high static coefficient and a low dynamic coefficient. For example, the secondary frictional material may have a static coefficient in the range of 0.20 to 0.30 and a dynamic coefficient in the range of 0.04 to 0.15.

After the secondary frictional material is bonded to the core plate the primary frictional material 22 in the figures may be bonded to the core plate over the secondary frictional material. The primary frictional material may also be a flat continuous annular ring consumable in use through wear disposed around the periphery of the core plate similar in width to the width of the secondary frictional material. The primary material 22 is several times thicker than the secondary material. It is made of a microscopically porous (micro-porous) paper-like material having good heat resistance and wearability. This primary frictional material has relatively close static and dynamic coefficient of friction values thus is generally quiet in operation.

Grooves 46 may be machined into the primary frictional material 22 to allow fluid to circulate and cool the braking surfaces. The horizontal and vertical grooves shown in the drawings are typical although various groove patterns or even non-grooved surfaces may be used.

The audible brake lining wear indicator will perform in the following manner. As the primary frictional material 22 is worn away or consumed through contact with the brake center disc 26 and the outer disc ring 30 the secondary frictional material 24 will be exosed to contact with either the brake center disc 26 or the outer disc ring 30. Upon contact a resonant noise will be emitted due to the characteristics of the secondary frictional material. Of course, the noise emitted by the secondary frictional material will be increased as more and more of the primary frictional material is worn away. The audible signal should be heard by the operator who can then schedule the vehicle for the appropriate brake repair.

It should be noted that the secondary frictional material may be as effective in braking a vehicle as the primary frictional material. Also, even though the secondary material may be relatively thin it may be designed to have a service life great enough to allow the vehicle to be operated until it can be gotten into a repair shop.

Neither the primary nor secondary frictional materials is as detrimental to the hydraulic fluid performance as would be the case if metal particles were generated through the wear of the brake system. This may be attributed to the fiberous structure of the frictional materials as contrasted to the non-fiberous structure of metalic particles.

ALTERNATIVE EMBODIMENTS

Numerous alternative embodiments regarding the secondary frictional material are available. Several of these are shown by FIGS. 3, 4, 6 and 7-11.

It has been found that only a small amount of the secondary frictional material need be exposed in order to generate an audible signal. Thus in FIG. 3 a plurality of alternative segments of secondary frictional material 64 and primary frictional material 62 have been provided to make up the alternative brake disc 60. In FIG. 4 another alternative brake disc 70 is equipped with circular discs of secondary braking material 74 adjacent to and surrounded by filler material 50 below the surface of the primary braking material 22. In either case a continuous flat ring of primary frictional material 22 covers the secondary frictional material as in the preferred embodiment shown in FIG. 2.

In FIG. 6 a cross section of secondary frictional material discs of FIG. 4 shows the core plate 18, a circular disc of secondary material 74 on each side of the core plate and then the primary frictional material 22 outermost on each side. Note that a filler 50 may surround the discs of secondary material. This filler may be either the primary frictional material or an unspecified third type of consumable microporous frictional material.

Also a similar filler may be used in the embodiment of FIG. 3 in place of the segments 62 which are not of secondary frictional material.

In FIG. 7 a portion of a fourth brake disc embodiment 80 is shown. The core plate 18 is similar to those in FIGS. 2 through 4 previously described. However, in FIG. 7 the application of the primary frictional material 82 is directly to the core plate 18 while the secondary frictional material 84 is also affixed to the core plate 18 in a band or annular ring between the inner diameter of the band or annular ring of primary frictional material 82 and the center of the friction plate or brake disc embodiment 80. The cross sectional view of FIG. 8 clearly shows this arrangement. Note that the primary frictional material 82 is thicker than the secondary frictional material 84 and further the primary material does not cover the secondary frictional material. In this embodiment the primary material would wear away in use thus allowing the secondary frictional material to come into contact with a reactive member (not shown).

Figure 9:
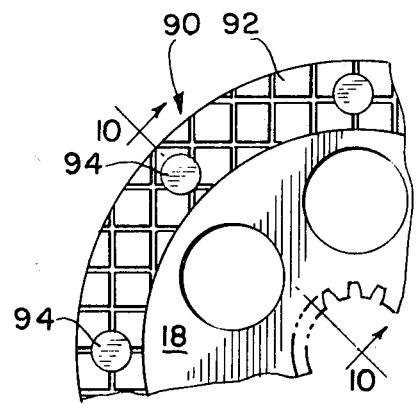
FIG. 9 is a broken away quandrant from a friction plate showing another alternative arrangement of frictional materials.
Figure 8:
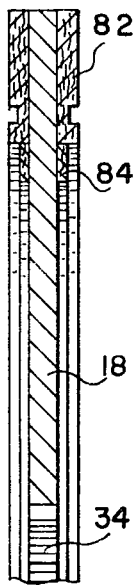
FIG. 8 is a cross sectional view through plane 8—8 of FIG. 8.
Figure 10:
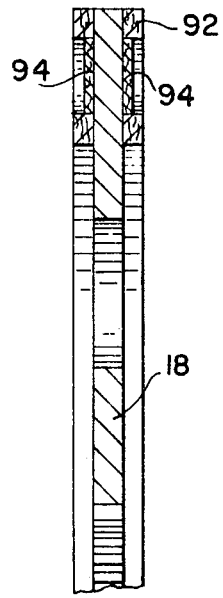
FIG. 10 is a cross sectional view through plane 10—10 of FIG. 9.
Figure 11:
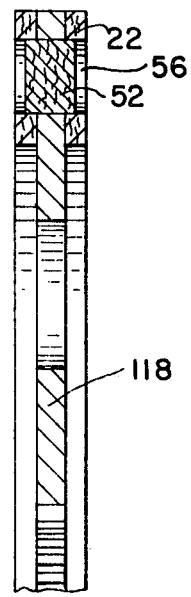
FIG. 11 is a cross sectional view of a friction plate.

FIG. 9 also shows a portion of a friction plate or fith embodiment of a brake disc 90 with a core portion 18. A band of primary frictional material 92 is bonded directly to the core plate 18. The secondary frictional material 94 is carried in apertures spaced around the band of the primary material. At least two configurations may be used as shown by FIGS. 10 and 11. First looking at FIG. 10, which is a cross section through the core plate 18 along plane 10-10 of FIG. 9, the primary frictional material 92 can be seen bonded to the core plate 18. A "button" or circlar disc of secondary frictional material 94 is bonded to the core plate in the apertures in the primary frictional material. As in the embodiment of FIG. 7 above note that the primary material does not cover the secondary material. When the primary frictional material 92 wears down to the level of the secondary material 94 the secondary material will be in contact with the reactive members of the system thus emitting a type of audible noise.

FIG. 11 is a further development. A cross section as shown by FIG. 11 shows that the core plate 118 is equipped with another set of apertures, one shown as 56, all the way through it. Into these apertures a slug or puck 52 of secondary frictional material is carried. This slug 52 of material is free to move between each side of the core plate and thus assures that the warning system will be available even when run out in the core plate may hamper the effectiveness of the described device.

Other alternative shapes for the secondary frictional material are possible (diamond, squares, bands, triangles, etc.) and are contemplated to be within the scope of this invention although they are not shown in the figures.

The preferred embodiment, i.e., the full ring laminate, may be more desirable than these alternative embodiments as it could point up localized failures such as a chip out of the primary frictional material. Also it may be less expensive to produce.

Another alternative use for this invention is in the field of clutches. In operation and principle the clutch of a vehicle works similarly to the friction plate brake disc as described above. The clutch is necessary to lock the flywheel to the output shafts thus allowing the engine to drive the drive wheels. The frictional materials used in wet cluches, however, are similar to those used in braking devices. FIG. 2 could alternatively be a wet clutch rather than a disc brake.

In the field of clutches it is also difficult to know when the clutch has worn out. Consequently, there is a possibility of damage as unprotected surfaces of the worn out clutch plate can come in contact with the flywheel and do considerable damage thereto. However, if the vehicle operator is forewarned by means of the warning system described above then the vehicle can be repaired at the first opportunity and thus preclude extensive damage to the vehicle flywheel.

Thus it is apparent that there has been provided in accordance with the invention, an audible brake lining wear indicator that fully satisfies the objects, aims, and advantages set forth above. While the invention has been described in conjunction with specific embodiments thereof it is evident that many alternatives, modifications, and variations will be apparent to those skilled in the art of the foregoing description. For instance, this laminated type of brake mounting wear indicator may be used in disc brake pucks for contact with the rotor in a dry brake system. Accordingly, it is intended to embrace all such altenatives, modifications and variations as fall within the spirit and broad scope of the appended claims.

What is claimed is:

1. In a friction disc for use in a frictional engagement device including reaction members operating in a fluid environment the improvement comprising:

a core plate having obverse and reverse faces and a plurality of apertures passing therethrough including a central aperture and apertures spaced inwardly of the outer periphery of the core plate;

a primary frictional material of microporous material in a configuration of an annular ring having a plurality of apertures therethrough, having its static coefficient of friction substantially similar to its dynamic coefficient, bonded to each face of the core plate with the apertures of the primary frictional material annular ring aligned with the apertures of the core plate which are spaced inwardly of said outer periphery;

slugs of secondary frictional material occupying the outer periphery core plate apertures, the slugs being slightly longer than the length of the outer periphery core plate apertures and freely slidable therein where the slugs are of such material as to produce an audible signal upon contact with cooperating reaction members to indicate wear of the primary frictional material.

2. The invention as disclosed in claim 1 wherein the frictional engagement device is used to control the relative motion of a second reaction member with respect to the motion of a first reaction member and where the friction disc primary frictional material may be consumed through normal wear to a degree such that the slugs of secondary material may come in contact with a reaction member whereby an audible noise will be generated.

* * * * *